United States Patent [19]

Miyake et al.

[11] Patent Number: 5,481,753
[45] Date of Patent: Jan. 2, 1996

[54] I/O DEVICE HAVING IDENTIFICATION REGISTER AND DATA REGISTER WHERE IDENTIFICATION REGISTER INDICATES OUTPUT FROM THE DATA REGISTER TO BE AN IDENTIFIER OR NORMAL DATA

[75] Inventors: Takashi Miyake; Nobusuke Abe, both of Hyogo, Japan

[73] Assignee: Mitsubishi Denki Kabushiki Kaisha, Tokyo, Japan

[21] Appl. No.: 902,118

[22] Filed: Jun. 22, 1992

[30]  Foreign Application Priority Data

Jun. 24, 1991 [JP] Japan ................................. 3-178720
Aug. 20, 1991 [JP] Japan ................................. 3-232301

[51] Int. Cl.$^6$ ...................................................... H01J 3/00
[52] U.S. Cl. .................. 395/823; 364/238.2; 364/238.7; 364/247.2; 364/DIG. 1
[58] Field of Search .................................. 395/200, 275, 395/325, 425, 550, 275, 823; 340/825.07, 825.13, 825.2, 825.21, 825.34; 364/178, 715.08, 715.11

[56]  References Cited

U.S. PATENT DOCUMENTS

| 4,390,944 | 6/1983 | Quackenbush et al. | 395/325 |
| 4,847,613 | 7/1989 | Sakurai et al. | 340/825.10 |
| 5,031,091 | 7/1991 | Wakatsuki et al. | 395/275 |

FOREIGN PATENT DOCUMENTS 0343853  2/1991  Japan .

*Primary Examiner*—Thomas C. Lee
*Assistant Examiner*—Sang Hui Kim
*Attorney, Agent, or Firm*—Townsend and Townsend and Crew

[57]  ABSTRACT

To enable data transfer between desired clock synchronous serial input/output devices without the need of a specific transmission/reception protocol, ordinary data and device number data for specifying a receiving input/output device are transmitted as data to be transmitted. When the data to be transmitted is the device number data stored in an identification information register, an input/output device having this device number is selected, and data is transferred to the input/output device.

4 Claims, 6 Drawing Sheets

I/O DEVICE HAVING IDENTIFICATION REGISTER AND DATA REGISTER WHERE IDENTIFICATION REGISTER INDICATES OUTPUT FROM THE DATA REGISTER TO BE AN IDENTIFIER OR NORMAL DATA

BACKGROUND OF THE INVENTION

1. Field of the Invention

The present invention relates to an input/output device for transferring data in serial order between data processors synchronous with a clock signal.

2. Description of the Prior Art

Figure 6:
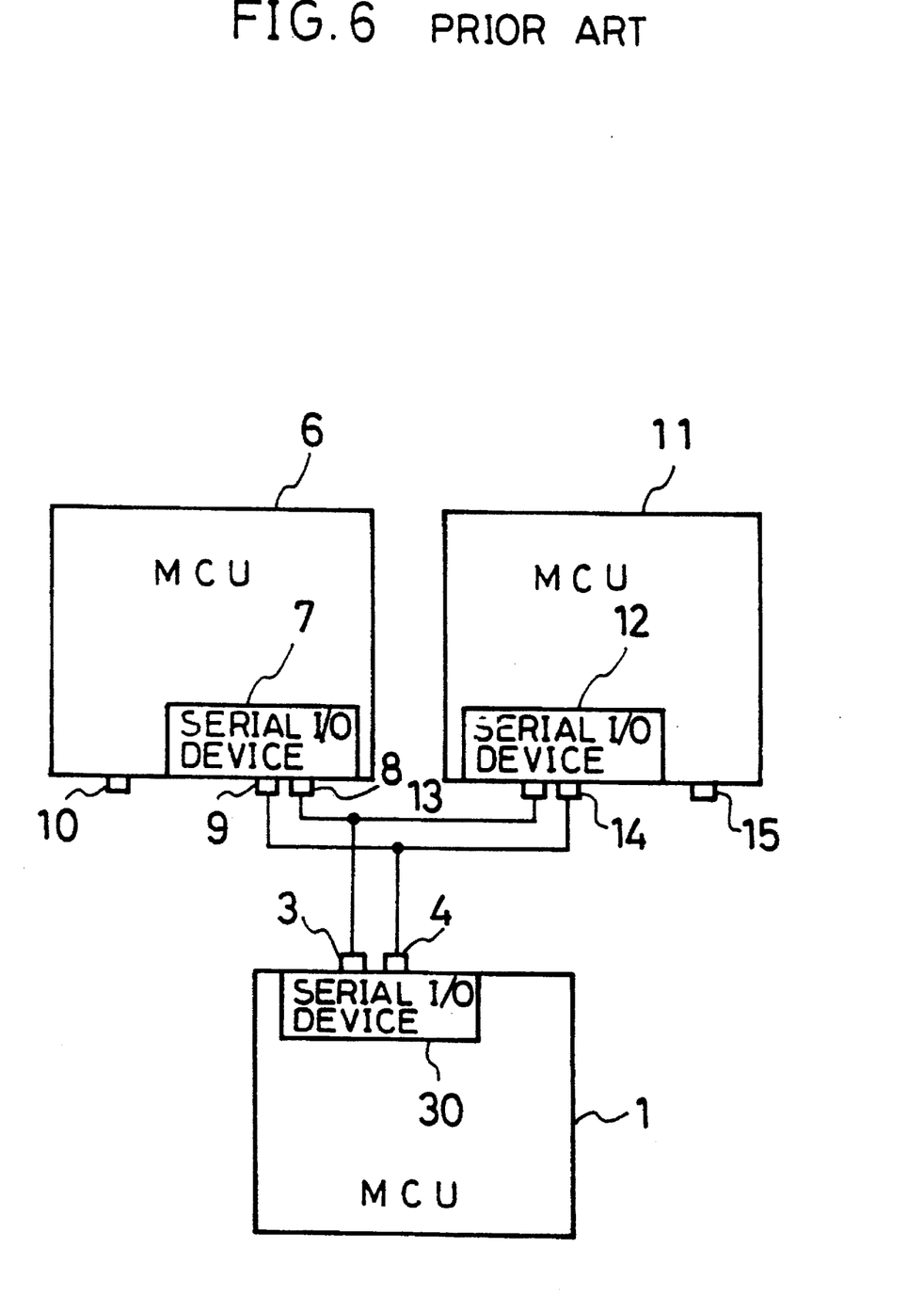
FIG. 6 is a block diagram of an example of connections among MCUs having conventional clock-synchronous serial input/output devices.

FIG. 6 is a block diagram showing connections among data processors having conventional clock-synchronous serial input/output devices (hereinafter called "serial input/output device"). In the figure, reference numerals 1, 6 and 11 represent micro-control units (MCU) which function as data processors, and 30, 7 and 12 represent serial input/output devices provided on the respective MCUs 1, 6 and 11. Serial input/output devices 30, 7 and 12 transmit and receive data in serial order in synchronization with a clock signal. Reference numeral 3 is the transmission data output terminal of serial input/output device 30; 4, the transmission clock output terminal of serial input/output terminal 30; 8, the reception data input terminal of serial input/output device 7; 9, the reception clock input terminal of serial input/output device 7; 13, the reception data input terminal of serial input/output device 12; 14, the reception clock input terminal of serial input/output device 12; 10, the interrupt signal input terminal of MCU 6; and 15, the interrupt signal input terminal of MCU 11. Transmission data output terminal 3 of serial input/output device 30 is connected to reception data input terminal 8 of serial input/output device 7 and to reception data input terminal 13 of serial input/output device 12. Meanwhile, transmission clock output terminal 4 of serial input/output device 30 is connected to reception clock input terminal 9 of serial input/output device 7 and to reception clock input terminal 14 of serial input/output device 12.

Figure 7:
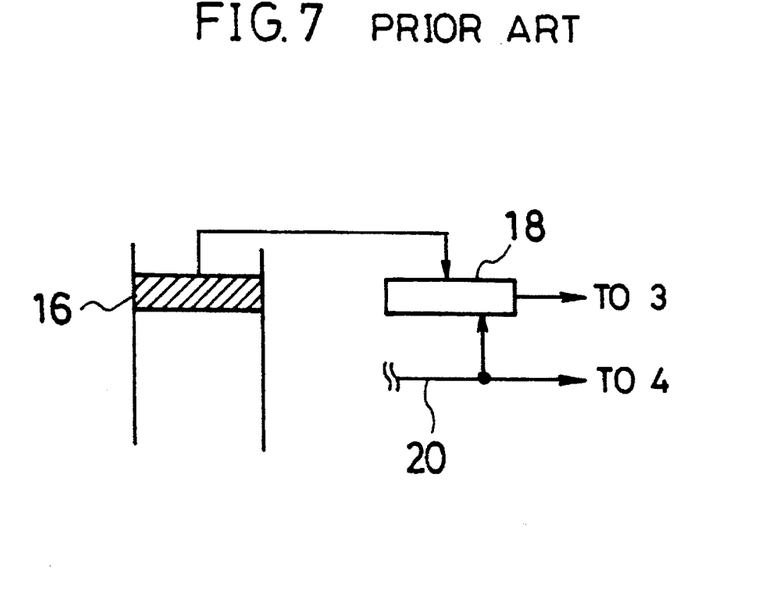
FIG. 7 illustrates an example of the circuit configuration of the transmission section of a conventional clock-synchronous serial input/output device.

FIG. 7 is a block diagram of the data transmission section of a conventional input/output device. In the figure, reference numeral 16 represents a transfer data storage register for storing transferred data; 18, a shifter for transferring and outputting data stored in serial order in transfer data storage register 16 serial order,; and 20, a transmission clock signal.

Figure 8:
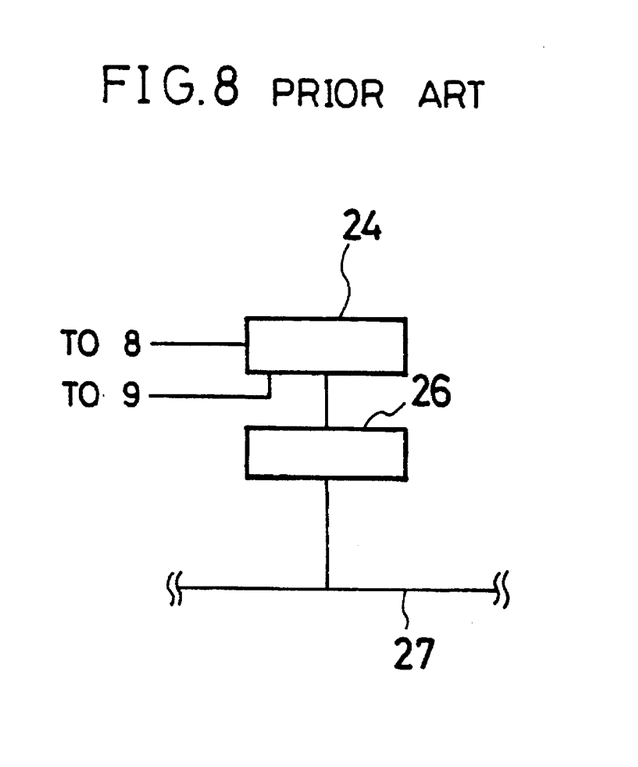
FIG. 8 illustrates an example of the circuit configuration of the reception section of a conventional clock-synchronous input/output device.

FIG. 8 is a block diagram of the circuit configuration of the data receiving section of a conventional serial input/output device. Reference numeral 24 indicates a shifter for receiving data in serial order; 26, a reception buffer register for storing received data; and 27, a bus wire.

The operation of the conventional input/output device will be explained hereafter. When serial data is transferred, transmission clock signal 20 of the data transmission section of serial input/output device 30 of data processor 1 is outputted from transmission clock output terminal 4, and transferred data within data storage register 16 is outputted in serial order from transmission data output terminal 3 via shifter 18 synchronously with transmission clock signal 20. Then, transmission clock signal 20 outputted from transmission clock output terminal 4 is received by reception clock input terminal 9 of serial input/output device 7 of data processor 6 and by reception clock input terminal 14 of serial input/output device 12 of data processor 11. Data transmitted from serial input/output device 30 of data processor 1 in synchronization with transmission clock signal 20 is received by reception data input terminal 8 of serial input/output device 7 of data processor 6 and by reception data input terminal 13 of serial input/output device 12 of data processor 11, thus performing data transfer. In the transmitting serial input/output device 30 of FIG. 7, data to be transmitted are stored in the transfer data storage register 16, then stored in the shifter 18 at the start of transfer, and transmitted in serial order by the shifter 18 in synchronization with the transmission clock 20.

In the receiving serial input/output devices 7 (12) of FIG. 8, the clock, and the data to be transferred in serial order, are received by reception data input terminal 8 (13) and by reception clock input terminal 9 (14) of serial input/output device 7 in synchronization with the clock received by shifter 24 for receiving data. The data received by shifter 24 is stored in reception buffer register 26.

Since the input/output device of the prior art does not have a specific transmission/reception protocol, data can be transferred only from serial input/output 30 to both of the serial input/output devices 7 and 12. If serial input/output devices 30 and 7 are provided with the same transmission/reception protocol, data transfer between these two serial input/output devices is possible. However, to provide the serial input/output devices with the protocol would cause problems such as a reduction in the length of transmission and reception data or the prohibition of transmitting specific data.

Since the conventional clock synchronous input/output device is structured as described above, when a single transmitting serial input/output device is connected to more than one receiving serial input/output device, a specific transmission/reception protocol common to both of the transmitting serial input/output devices and to the selected receiving serial input/output device is required to transfer data between these devices.

SUMMARY OF THE INVENTION

In view of the problem with the prior art, it is an object of the present invention to achieve an input/output device which can transfer data to a desired receiving serial input/output device without the need for a specific transmission/reception protocol common to both serial input/output devices. More particularly, it is an object of the present invention to achieve an input/output device which can transfer data to a selected receiving serial input/output device, using an 8-bit fixed transfer format which is common to clock synchronous serial input/output devices.

An input/output device of a first embodiment of the invention, which comprises a register for storing data to be transmitted and a shifter for transmitting the data in serial order in synchronization with a clock, includes a device identification information register for storing identification information (whether the data is device number data previously assigned to a receiving input/output device) and an output terminal for outputting the identification information.

An input/output device of a second embodiment of the invention, which comprises a shifter for receiving data transmitted in serial order in synchronization with a clock and a register for storing the data from the shifter, includes a device number data register for storing data about a device number previously assigned to the device; an input terminal for receiving identification information on whether the data is device number data; and comparing means for comparing the data stored in the device number data register and the data received by the shifter, based on the identification information.

When the data stored in the shifter and the data stored in the device number data register are compared by the comparing and these data agree, a completion interrupt is generated to permit the register to receive and store data from the shifter. When these data disagree, a reception completion interrupt is not generated and data from the shifter cannot be received by or stored in the register.

The above and other objects, features and advantages of the invention will become more apparent from the following description when taken in conjunction with accompanying drawings.

DESCRIPTION OF THE PREFERRED EMBODIMENT

Embodiment 1

Figure 1:
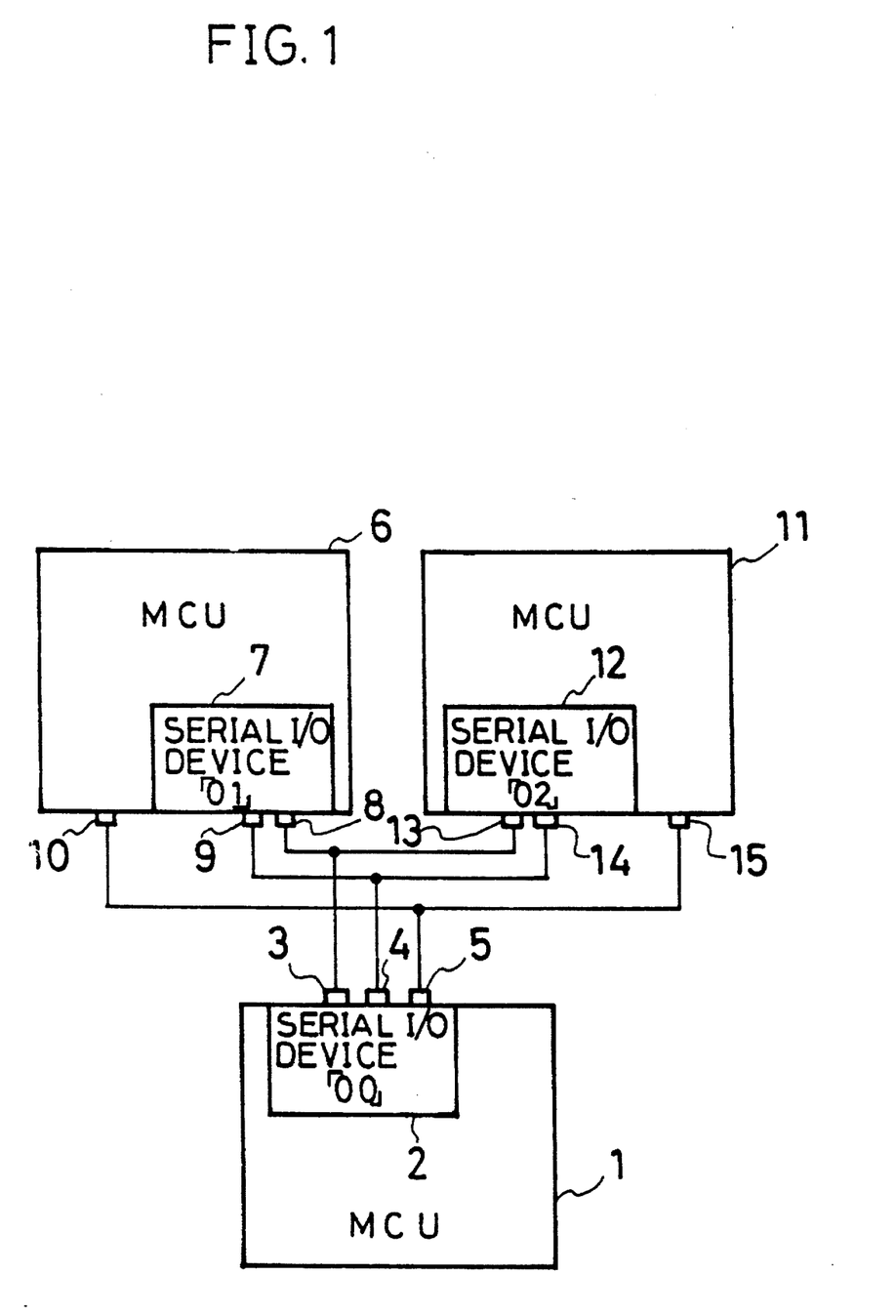
FIG. 1 is a block diagram of connections among MCUs, one of which has a clock-synchronous serial input/output device according to a first embodiment of the invention.

An embodiment of the first invention will now be described FIG. 1 is a block diagram of an example of connections among MCUS, where one MCU has a serial input/output device (of clock-synchronous type) in accordance with this invention.

In the figure, reference numerals 1, 6 and 11 represent MCUs; 2 is a serial input/output device of the present invention incorporated in the MCU 1; 3 is the transmission data output terminal of this serial input/output device 2; 4 is the transmission clock output terminal of this serial input/ output device 2; and 5 is the output terminal of the device identification information register disposed on serial input/ output device 2, which outputs identification information on whether transferred data is device number data assigned to the receiving serial input/output devices 7 and 12. The numeral 7 represents a conventional clock synchronous serial input/output device incorporated in the MCU 6; 8 is the reception data input terminal of serial input/output device 7; 9 is the reception clock input terminal of serial input/output device 7; 10 is the interrupt signal input terminal of the MCU 6; 12 is a conventional clock-synchronous serial input/output device incorporated in the MCU 11; 13 is the reception data input terminal of serial input/output device 12; 14 is the reception clock input terminal of serial input/output device 12, and 15 is the interrupt signal input terminal of the MCU 11.

Figure 2:
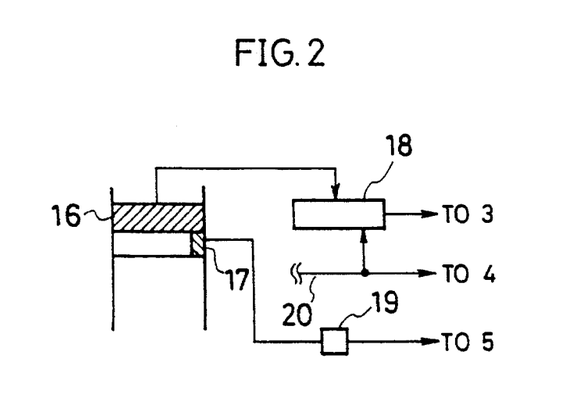
FIG. 2 illustrates the circuit configuration of the transmission section of a transmitting clock-synchronous serial input/output device of the embodiment.

FIG. 2 is a block diagram of the circuit configuration of the data transmission section of the input/output device of the present invention, that is, the serial input/output device 2.

In the figure, reference numeral 16 represents a transferred data storage register, and 17, a device identification information register (1 bit) for storing information on whether the transferred data is device number data assigned to receiving serial input/output devices 7 and 12. The numeral 18 indicates a shifter for transmitting the transferred data in serial order to output terminal 3 in synchronization with the clock; 19 is a latch circuit for latching the data (identification information) of device identification information register 17 upon data transfer and for outputting the data to output terminal 5; and 20 is a transmission clock.

Figure 3:
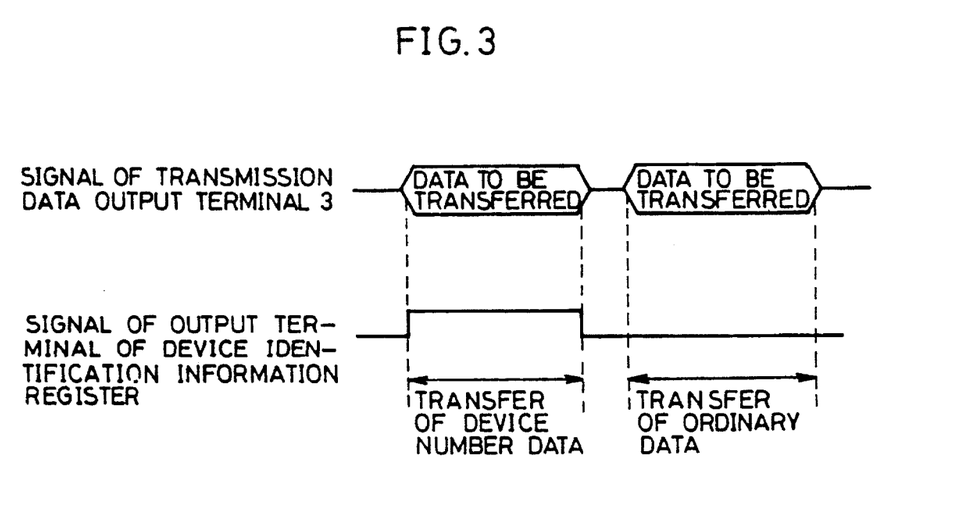
FIG. 3 is a timing chart of data of the transmitting clock-synchronous serial input/output device of the embodiment.

FIG. 3 is a timing chart of data transmission.

The operation of the serial input/output device of the present invention will now be described. For data transfer by the input/output device of the first embodiment of the invention, numbers are assigned in advance to the receiving serial input/output devices 7 and 12 connected to the transmitting serial input/output device 2. For example, as shown in FIG. 1, "01" is assigned to serial input/output device 7, and "02" to serial input/output device 12. To transfer data to a receiving serial input/output device, the device number data ("01" or "02") of the receiving serial input/output device is first set in the transferred data storage register 16, and "1" is set in the device identification information register 17. Then, data transfer is started. At the start of data transfer, output terminal 5 of device identification information register 17 of serial input/output device 2 becomes "1" as shown in FIG. 3, and device number data ("01" or "02") is transferred in synchronization with transmission clock 20. After completion of the data transfer, output terminal 5 of the device identification information register 17 of serial input/output device 2 becomes "0". In contrast, the receiving MCUs 6 and 11 first accept an interrupt according to a change in the level of output terminal 5 of device identification information register 17 of serial input/output device 2 connected to interrupt signal input terminals 10 and 15. For interrupt processing, each of the MCUs 6 and 11 compares the transferred data (device number data) with the device number data assigned to the respective input/output devices 7 and 12. When these data agree, subsequent data is received, but when these data disagree, software is used to prohibit the reception of subsequent data. Namely, when the transmitting MCU 1 transmits ordinary data which indicates that the value of device identification information register 17 is "0", only the MCU having a selected serial input/output device continues to receive data. Thereafter, when MCU 1 transmits data which indicates that the value of the device identification information register is "1" the same serial input/output device continues to receive the transferred data until a receiving input/output device is changed. Conversely, to change a receiving input/output device, the value of device identification information register 17 is set at "1", and the device number data of a receiving serial input/output device is transmitted.

With reference to FIG. 2, transmission data is set in the transferred data storage register 16, and when the transmission data is the device number data of a serial input/output device, the device identification information register 17 is set at "1." When the data is normal data, the register is set at "0." At the start of transmission, the data in register 16 is sent to shifter 18 and is outputted to terminal 3 one bit at a time in synchronization with transmission clock 20. The identification information ("0" or "1") of register 17 is set in latch circuit 19 at the start of transmission, outputted to terminal 5 and reset upon the completion of transmission.

Embodiment 2

Figure 4:
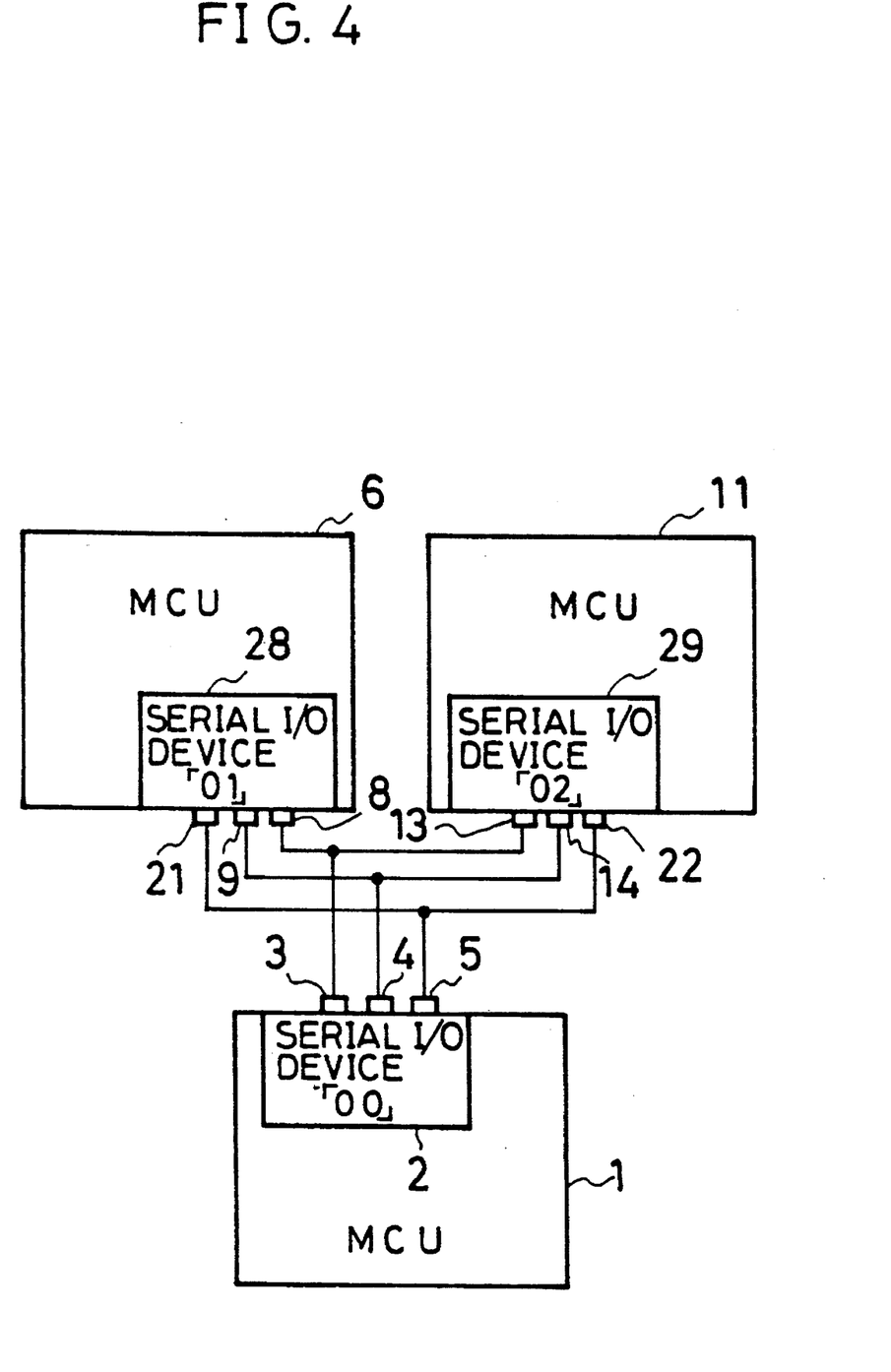
FIG. 4 is a block diagram of connections among MCUs having clock-synchronous serial input/output devices according to a second embodiment of the invention.

A second embodiment of the invention will be described next. FIG. 4 is a block diagram of connection among MCUs having clock-synchronous serial input/output devices of this invention.

In the figure, reference numerals 1, 6 and 11 represent MCUs; 2 is a clock synchronous serial input/output device ("00") of MCU 1; 3 is the transmission data output terminal of serial input/output device 2; 4 is the transmission clock output terminal of serial input/output device 2; 5 is the output terminal of the device identification information register of serial input/output device 2; 28 is the clock-synchronous serial input/output device ("01") of MCU 6; 8 is the reception data input terminal of serial input/output device 28; 9 is the reception clock input terminal of serial input/output device 28; 29 is the clock synchronous serial input/output device ("02") of MCU 11; 13 is the reception data input terminal of serial input/output device 29; 14 is the reception clock input terminal of serial input/output device 29; 21 is the device identification information signal receiving terminal of serial input/output device 28; and 22 is the device identification information signal receiving terminal of serial input/output device 29.

Figure 5:
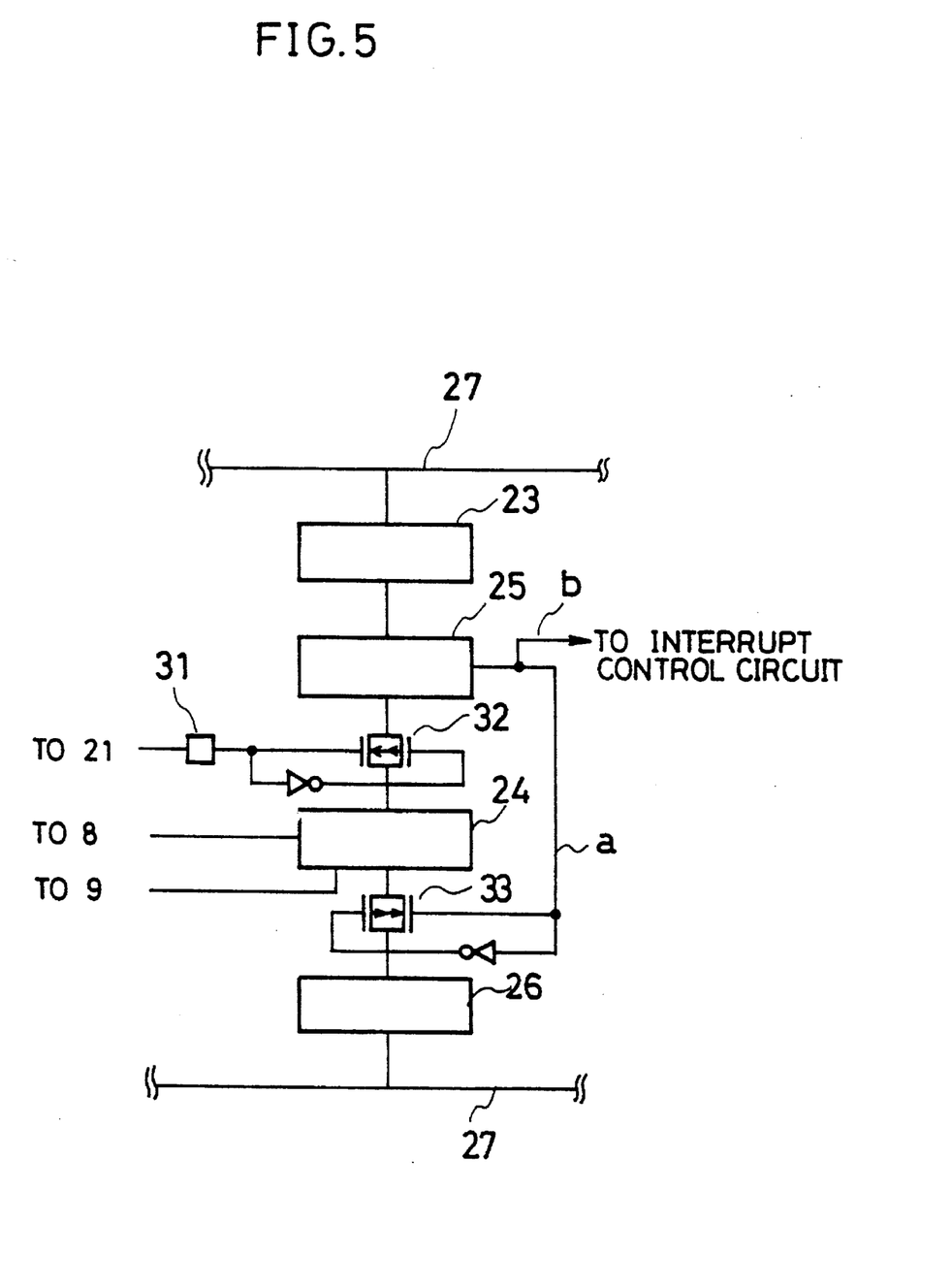
FIG. 5 illustrates the circuit configuration of the reception section of a receiving clock-synchronous serial input/output device of the embodiment.

FIG. 5 shows an example of the circuit configuration of the data reception section of a receiving serial input/output device of the present invention. Serial input/output device 28 will be described as a receiving serial input/output device.

In the figure, reference numeral 23 represents a device number data storage register for storing device number data previously assigned to the serial input/output device; 24 is a reception shifter for receiving transmitted data; 25 is a comparator circuit for comparing the value of device number data storage register 23 with the data received by reception shifter 24; 26 is a reception buffer register for storing data received by shifter 24; 27 is a bus wire; and 31 is a latch circuit for latching a device identification information signal. Numbers 32 and 33 represent MOSFETs which function as switches.

For data transfer operations, the transmitting serial input/output device of this embodiment operates in the same manner as the transmitting serial input/output device of the first embodiment of the invention, described above. Only the receiving serial input/output devices operate differently. Therefore, the operation of serial input/output device 28 which functions as a receiving serial input/output device will be described. Receiving serial input/output device 28 first sets its own device number data in the device number data storage register 23. When data (identification information) sent from device identification information register 17 of the transmitting serial input/output device indicates "1", the transmitted data is received by shifter 24 of receiving serial input/output device 28, and the identification information is latched by latch circuit 31. According to this data (identification information "1"), the received data (the device number data assigned to the transmitting serial input/output device) and the data stored in the device number data storage register 23 (the device number data assigned to the receiving serial input/output device) are compared by the comparator circuit 25. When these data agree, a coincidence signal "a" is outputted and the switch 33 is turned on to enable the the data stored in shifter 24 to be stored in the reception buffer register 26. On the other hand, when these data disagree, storage of data in the reception buffer 26 is disabled. When data from device identification information register 17 of the transmitting serial input/output device indicates "0" the data is first received by shifter 24 of the receiving serial input/output device as usual. According to the data (identification information "0") latched by latch circuit 31, comparison by comparator circuit 25 is not performed. The received data is stored in reception buffer register 26 when storage in the reception buffer register 26 is enabled, whereas it is not stored in the register when storage is disabled. In this way, the data is received only by a selected serial input/output device.

In FIG. 5, the data of device number data storage register 23 and the data of shifter 24 are compared. When these data agree, a reception completion interrupt signal "b" is outputted to store the data of shifter 24 in the reception buffer register 26. When the data disagree, signal "b" is not outputted, and the data of shifter 24 is not stored in reception buffer register 26.

In the MCU having a receiving clock-synchronous serial input/output device according to the first embodiment of the invention, processing which has been performed by interrupt processing of software can be conducted by serial input/output device hardware.

As described in the foregoing, according to the first embodiment of the invention, since a device identification information register and a terminal for outputting the contents of the register are provided, data transfer between desired clock-synchronous serial input/output devices is made possible by common 8 bit-fixed clock synchronization and not by a specific transmission/reception protocol common only to the clock synchronous serial input/output devices.

According to the second embodiment of the invention, in a receiving clock-synchronous serial input/output device, data transfer between desired serial input/output devices can be processed by hardware rather than software due to common 8-bit fixed-clock synchronization.

While the above is a complete description of the preferred embodiment of the invention, various alternatives, modifications, and equivalents may be used. Therefore, the above description should not be taken as limiting the scope of the invention, which is defined by the appended claims.

What is claimed is:

1. An input/output device comprising:

a first storage register for storing a plurality of data including normal data and device number data indicating a transmission destination to be transmitted in synchronization with a concurrently transmitted clock signal:

a second storage register for storing an identification code having "1" which indicates that transmission data is the device number data of a serial input/output device and having "0" which indicates that the transmission data is normal;

an output terminal, coupled to an output of said second storage register, for outputting said identification code; and a shifter, coupled to said first storage register, for accessing said device number data from said first storage register when said identification code output from said second storage register to said output terminal has "1"

and serially outputting said device number data in synchronization with said clock signal, and for accessing said normal data from said first storage register when said identification code has "0" and serially outputting said normal data in synchronization with said clock signal.

2. An input/output device comprising:

a shifter for receiving a plurality of serial data including normal data and a second device identifier indicating a transmission destination at a first input terminal in synchronization with a clock signal received concurrently on a second input terminal;

a second register for storing a first device identifier assigned to input/output;

a third input terminal for receiving an identification code having "1" which indicates that said serial data is the device number data of a serial input/output device and having "0" which indicates that said serial data is normal;

a comparator, coupled to said shifter and to said second register, for comparing said first device identifier stored in said second register and said second device identifier received by said shifter when said identification code received at said third input terminal has "1"; and a first register, coupled to said shifter and said comparator, for storing normal serial data received by said shifter when it is found by comparison with said comparator that said second device identifier matches said first device identifier, and for not storing normal serial data received by said shifter when it is found by comparison with said comparator that said second device identifier does not match said first device identifier.

3. The input/output device according to claim 2 wherein said comparator compares said first device identifier and said second device when said identification code has said particular value and the input/output device further comprises:

reception control means, coupled to said comparator, for permitting transmission of said plurality of serial data from said shifter to said first register when said first device identifier matches said second device identifier, said reception control means inhibiting transmission of said plurality of serial data from said shifter to said first register when said first device identifier does not match said second device identifier.

4. The input/output device according to claim 2 wherein said comparator compares said first device identifier and said second device when said identification code has said particular value and the input/output device further comprises:

reception control means, coupled to said comparator, for generating a reception completion interrupt to initiate storage of said plurality of serial data from said shifter to said first register when said first device identifier matches said second device identifier, said reception control means inhibiting generation of said reception completion interrupt to prohibit storage of said plurality of serial data from said shifter to said first register when said first device identifier does not match said second device identifier.

* * * * *